(12) United States Patent
Furuta

(10) Patent No.: US 9,500,266 B2
(45) Date of Patent: Nov. 22, 2016

(54) GEAR DEVICE, DRIVE DEVICE AND ELECTRONIC DEVICE

(71) Applicant: KYOCERA Document Solutions Inc., Osaka (JP)

(72) Inventor: Shinji Furuta, Osaka (JP)

(73) Assignee: KYOCERA DOCUMENT SOLUTIONS INC., Osaka (JP)

(\*) Notice: Subject to any disclaimer, the term of this patent is extended or adjusted under 35 U.S.C. 154(b) by 473 days.

(21) Appl. No.: 14/090,651

(22) Filed: Nov. 26, 2013

(65) Prior Publication Data

US 2014/0150585 A1   Jun. 5, 2014

(30) Foreign Application Priority Data

Nov. 30, 2012 (JP) ................. 2012-262237

(51) Int. Cl.
| | |
|---|---|
| F16H 35/00 | (2006.01) |
| G03G 15/00 | (2006.01) |
| G03G 21/16 | (2006.01) |

(52) U.S. Cl.
CPC ........... *F16H 35/00* (2013.01); *G03G 15/757* (2013.01); *G03G 21/1647* (2013.01); *G03G 2221/1657* (2013.01); *Y10T 74/19614* (2015.01)

(58) Field of Classification Search
CPC ................ Y10T 74/19614; Y10T 74/1494; Y10T 74/2063; Y10T 74/20636; Y10T 74/20654
See application file for complete search history.

(56) References Cited

U.S. PATENT DOCUMENTS

2004/0180586 A1   9/2004   Yasuda et al.

FOREIGN PATENT DOCUMENTS

| JP | 2007-022763 | 2/2007 |
| JP | 2007155101 A * | 6/2007 |
| JP | 2008-026650 | 2/2008 |

OTHER PUBLICATIONS

Machine translation of Sato (2007).*

\* cited by examiner

*Primary Examiner* — David Gray
*Assistant Examiner* — Sevan A Aydin
(74) *Attorney, Agent, or Firm* — Wenderoth, Lind & Ponack, L.L.P.

(57) ABSTRACT

A gear device includes a gear means configured to transmit a torque of a motor to a rotating member. The gear means includes a rotor and an armature. The gear device further includes a coupling force applying part and a resistance force generating part. The coupling force applying part is configured to apply a coupling force so as to couple the rotor and the armature to each other. The resistance force generating part is configured to apply a resistance force acting against the coupling force to the gear means along with movement of the gear means away from the rotating member.

7 Claims, 5 Drawing Sheets

GEAR DEVICE, DRIVE DEVICE AND ELECTRONIC DEVICE

CROSS-REFERENCE TO RELATED APPLICATION(S)

This application is based upon and claims the benefit of priority from Japanese Patent Application(s) No. 2012-262237 filed on Nov. 30, 2012, the entire contents of which are incorporated herein by reference.

BACKGROUND

The technology of the present disclosure relates to a gear device, a drive device and an electronic device provided with the drive device.

In an electronic device such as a multi function peripheral or a printer, a drive device provided with a gear device is installed in order to transmit a torque of a motor to a roller (e.g., a photosensitive drum). The gear device includes a rotor and an armature. The rotor and the armature are coupled or decoupled by an electromagnetic force, thereby controlling rotation of the gear device.

For example, there is proposed a technology in which the rotation direction of a motor of an electronic device is switched between a clockwise direction and a counterclockwise direction. With this technology, when a drive device is in operation, a rotor and an armature are coupled by an electromagnetic force. Regardless of the rotation direction of the motor (namely, regardless of whether the rotation direction of the motor is clockwise or counterclockwise), a gear device rotates in a state in which the rotor and the armature make close contact with each other.

SUMMARY

A gear device according to one aspect of the present disclosure includes a gear means configured to transmit a torque of a motor to a rotating member. The gear means includes a rotor and an armature. The gear device further includes a coupling force applying part and a resistance force generating part. The coupling force applying part is configured to apply a coupling force so as to couple the rotor and the armature to each other. The resistance force generating part is configured to apply a resistance force acting against the coupling force to the gear means along with movement of the gear means away from the rotating member.

DETAILED DESCRIPTION

A drive device according to an embodiment and an electronic device provided with the drive device will now be described with reference to the drawings.

[Electronic Device]

Figure 1:
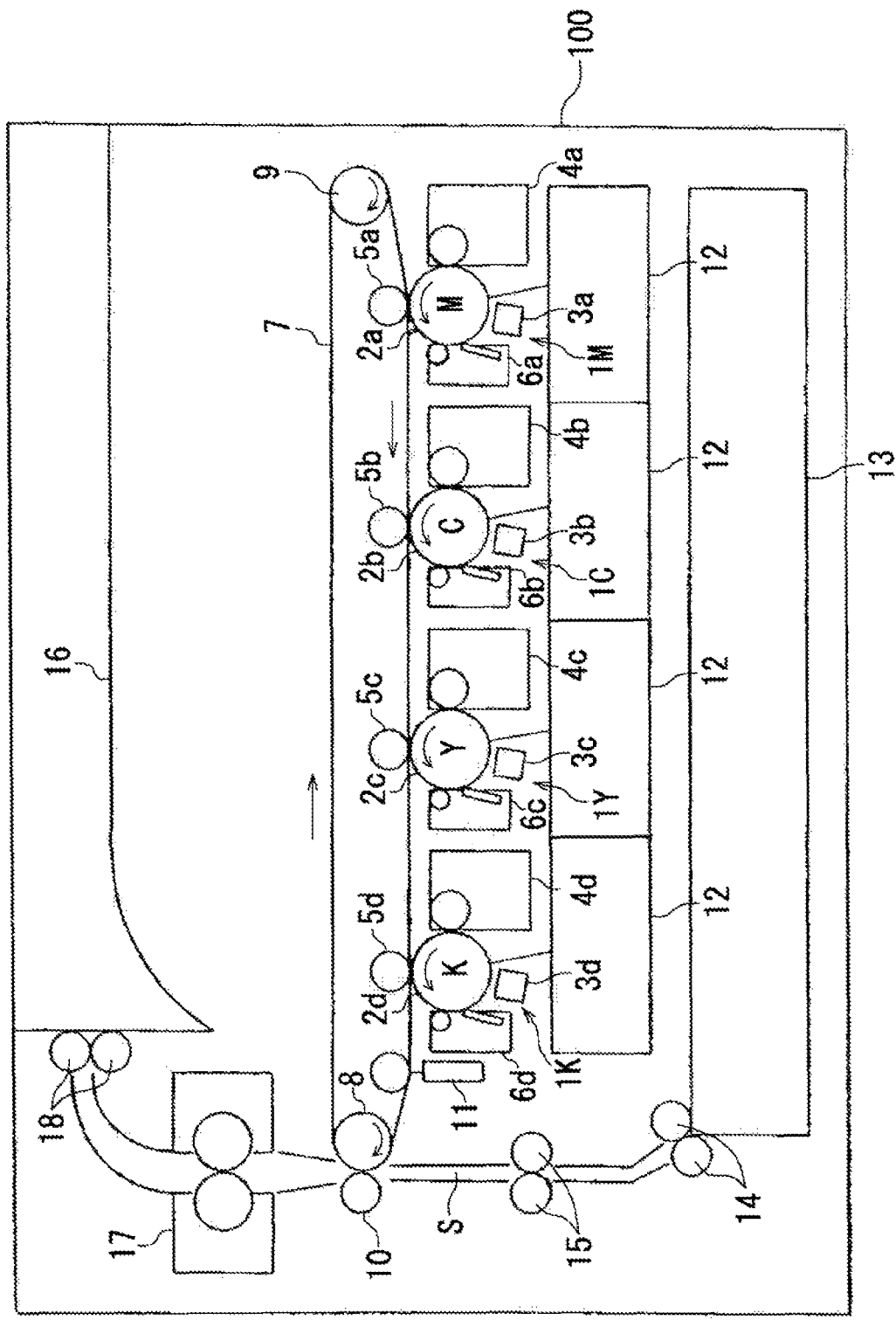
FIG. 1 is a side section view showing an image forming device according to an embodiment.

Referring to FIG. 1, description will be made on a basic configuration of an electronic device according to the present embodiment. For example, the electronic device according to the present embodiment is an image forming device 100. FIG. 1 is a side section view of the image forming device 100. Specifically, the image forming device 100 is a color printer. The image forming device 100 includes a magenta image forming unit 1M, a cyan image forming unit 1C, a yellow image forming unit 1Y and a black image forming unit 1K, which are arranged at a regular interval in a central region within the image forming device 100.

A photosensitive drum 2a as an image carrier is arranged in the magenta image forming unit 1M. An electrifier 3a, a developer 4a, a transfer roller 5a and a cleaner 6a are arranged around the photosensitive drum 2a.

In the cyan image forming unit 1C, the yellow image forming unit 1Y and the black image forming unit 1K, just like the magenta image forming unit 1M, there are arranged photosensitive drums 2 (specifically, photosensitive drums 2b, 2c and 2d). Electrifiers 3 (specifically, electrifiers 3b, 3c and 3d), developers 4 (specifically, developers 4b, 4c and 4d), transfer rollers 5 (specifically, transfer rollers 5b, 5c and 5d) and cleaners 6 (specifically, cleaners 6b, 6c and 6d) are arranged around the photosensitive drums 2.

Each of the photosensitive drums 2a to 2d includes a photoreceptor, a drum serving as a roller, a motor and a gear device. The image forming device 100 includes a gear device, a motor for generating a torque, and a drum which receives the torque of the motor via a drive device. Thus, the image forming device 100 serves as an electronic device. The drum, the motor and the gear device will be described in detail with reference to FIGS. 2 to 5.

The drum of each of the photosensitive drums 2a to 2d is rotationally driven counterclockwise at a predetermined process speed. The electrifiers 3a to 3d uniformly electrifies the surfaces of the photosensitive drums 2a to 2d at a specified electric potential using an electrifying bias voltage applied from an electrifying bias voltage supply (not shown).

The developer 4a retains a magenta toner, the developer 4b retaining a cyan toner, the developer 4c retaining a yellow toner and the developer 4d retaining a black toner. The developers 4a to 4d affix the toners of different colors to individual electrostatic latent images formed on the respective photosensitive drums 2a to 2d in a corresponding relationship with the developers 4a to 4d, thereby visualizing the individual electrostatic latent images as toner images of different colors.

The transfer rollers 5a to 5d are arranged so that they can make contact with the respective photosensitive drums 2a to 2d through an intermediate transfer belt 7. In the present disclosure, the contact portion between each of the photosensitive drums 2a to 2d and each of the transfer rollers 5a to 5d will be referred to as a primary transfer portion.

The intermediate transfer belt 7 is stretched between a driving roller 8 and a tension roller 9 and is movably arranged at the upper surface side of the photosensitive drums 2a to 2d. The driving roller 8 is arranged so that it can make contact with a secondary transfer roller 10 through the intermediate transfer belt 7. In the subject specification, the contact portion between the driving roller 8 and the secondary transfer roller 10 will be referred to as a secondary transfer portion. An optical concentration sensor 11 is arranged near the driving roller 8 in such a position as to face the intermediate transfer belt 7.

Below the magenta image forming unit 1M, the cyan image forming unit 1C, the yellow image forming unit 1Y and the black image forming unit 1K, four optical scanners 12 are arranged in a corresponding relationship with the magenta image forming unit 1M, the cyan image forming unit 1C, the yellow image forming unit 1Y and the black image forming unit 1K. Furthermore, a paper feeding cassette 13 is removably installed below the four optical scanners 12 (in the bottom portion of the image forming device 100). A plurality of papers (not shown) is held within the paper feeding cassette 13 in a stacked state. A conveying roller pair 14 is installed near the paper feeding cassette 13.

The conveying roller pair 14 takes out papers from the paper feeding cassette 13 and feeds the papers to a conveying path S one by one. The conveying path S extends in an up-down direction along a lateral portion of the image forming device 100.

A register roller pair 15 is installed on the conveying path S. The register roller pair 15 temporarily keeps the paper taken out from the paper feeding cassette 13 and then supplies the paper to the secondary transfer portion at a specified timing.

The conveying path S extends from the vicinity of the paper feeding cassette 13 to a paper discharge tray 16 installed on the upper surface of the image forming device 100. A fixing unit 17 and a paper discharging roller pair 18 are installed midway of the conveying path S extending to the paper discharge tray 16.

Subsequently, an image forming operation performed by the image forming device 100 will be described with reference to FIG. 1. If an image formation start signal is issued, the photosensitive drums 2a to 2d of the magenta image forming unit 1M, the cyan image forming unit 1C, the yellow image forming unit 1Y and the black image forming unit 1K are rotationally driven counterclockwise at a predetermined process speed. Then, the photosensitive drums 2a to 2d are uniformly electrified by the electrifiers 3a to 3d.

The optical scanners 12 emit light beams modulated by color image signals of different colors. By irradiating the light beams on the surfaces of the photosensitive drums 2a to 2d, the optical scanners 12 form electrostatic latent images corresponding to the color image signals of different colors on the photosensitive drums 2a to 2d.

If a magenta toner is affixed to the photosensitive drum 2a by the developer 4a, the electrostatic latent image formed on the photosensitive drum 2a of the magenta image forming unit 1M is visualized as a magenta toner image. A developing bias voltage having the same polarity as the electrification polarity of the photosensitive drum 2a is applied to the developer 4a. In the primary transfer portion between the photosensitive drum 2a and the transfer roller 5a, the magenta toner image is firstly transferred to the rotationally-driven intermediate transfer belt 7 by the action of the transfer roller 5a. A primary transfer bias voltage having the polarity opposite to the toner polarity is applied to the transfer roller 5a.

The intermediate transfer belt 7, to which the magenta toner image is firstly transferred, is moved to the cyan image forming unit 1C. In the cyan image forming unit 1C, a cyan toner image formed on the photosensitive drum 2b is overlappingly transferred over the magenta tonner image of the intermediate transfer belt 7 in the primary transfer portion between the photosensitive drum 2b and the transfer roller 5b.

Similarly, a yellow toner image formed on the photosensitive drum 2c and a black tonner image formed on the photosensitive drum 2d are sequentially superposed, in the corresponding primary transfer portions, on the magenta toner image and the cyan tonner image overlappingly transferred to the intermediate transfer belt 7. Thus, a full-color toner image is formed on the intermediate transfer belt 7. The toners not transferred to the intermediate transfer belt 7 and remaining on the respective photosensitive drums 2a to 2d are removed by the respective cleaners 6a to 6d.

In synchronism with the timing at which the leading end of the full-color toner image on the intermediate transfer belt 7 reaches the secondary transfer portion existing between the driving roller 8 and the secondary transfer roller 10, the paper fed from the paper feeding cassette 13 to the conveying path S by the conveying roller pair 14 is conveyed to the secondary transfer portion by the register roller pair 15. In the secondary transfer portion, the full-color toner image as a whole is secondarily transferred to the paper by the secondary transfer roller 10. A secondary transfer bias voltage having the polarity opposite to the toner polarity is applied to the secondary transfer roller 10.

The paper, to which the full-color toner image is transferred, is conveyed to the fixing unit 17 where the full-color toner image is heated, pressed and thermally fixed to the surface of the paper. The paper, to which the toner image is thermally fixed in this manner, is discharged onto the paper discharge tray 16 by the paper discharging roller pair 18. Thus, a series of image forming operations is finished.

[Drive Device]

Figure 2:
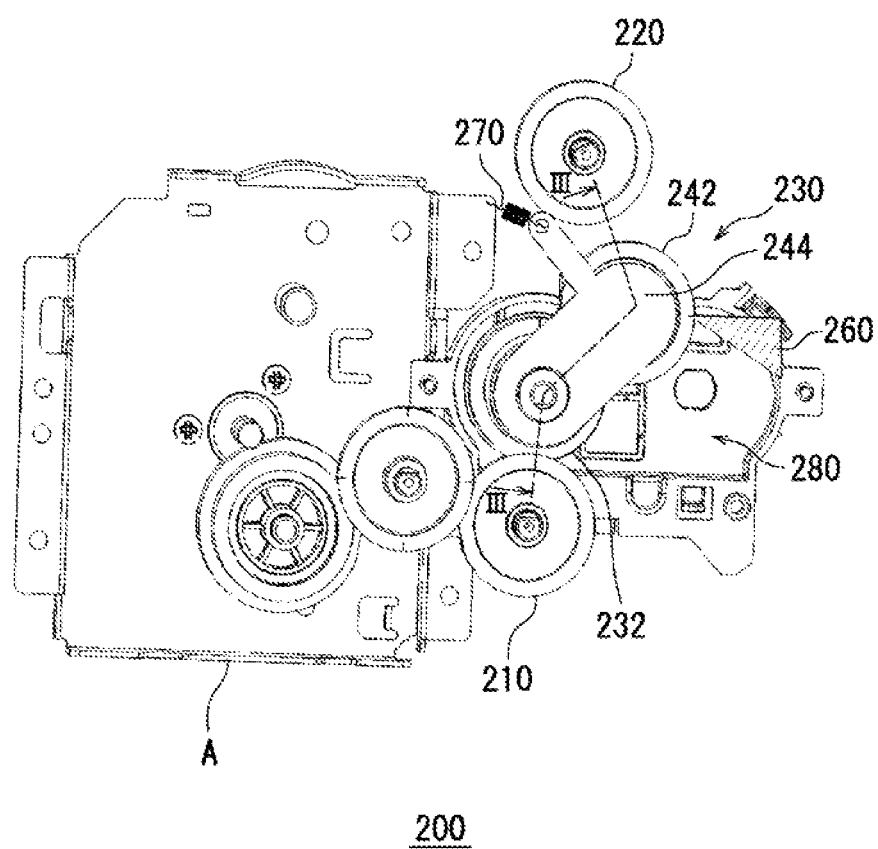
FIG. 2 is a schematic view showing a drive device according to an embodiment.

As described above with reference to FIG. 1, the image forming device 100 includes a drive device 200 shown in FIG. 2 and, therefore, serves as an electronic device. Next, the basic configuration of the drive device 200 according to the present embodiment will be described with reference to FIGS. 2 and 3.

FIG. 2 is a schematic view showing the drive device 200 according to the present embodiment. The drive device 200 includes a motor 210 and a roller 220. The roller 220 serves as a rotating member. The drive device 200 further includes a gear device 230. The gear device 230 transmits the torque of the motor 210 to the roller 220. The gear device 230 includes a gear means 280. The gear means 280 includes a first gear unit 232 connected to the motor 210, a second gear unit 242 connected to the first gear unit 232, and a connecting unit 244 which interconnects the first gear unit 232 and the second gear unit 242. The rotating shaft of the second gear unit 242 is rotatably connected to the connecting unit 244.

The gear device 230 further includes a lock mechanism 260 and a coil spring 270. The lock mechanism 260 serves as a resistance force generating part. The coil spring 270 serves as a biasing force applying means. The coil spring 270 applies a biasing force to the second gear portion 242 in a direction in which the second gear unit 242 moves toward the roller 220. The gear device 230 of the drive device 200 is attached to an attachment plate A.

Figure 3:
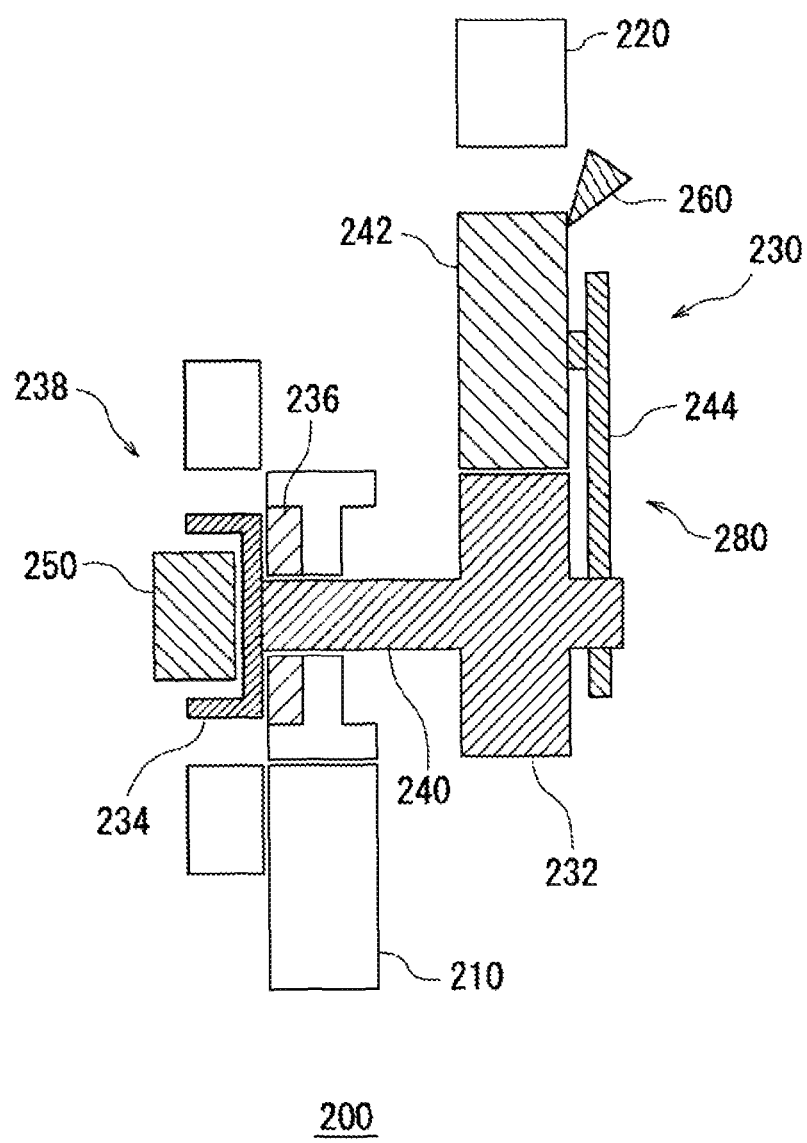
FIG. 3 is an enlarged section view showing a portion of the drive device according to the embodiment.

FIG. 3 is an enlarged section view (taken along line III-III in FIG. 2) showing a portion of the drive device 200 according to the present embodiment. The details of the drive device 200 will be described with reference to FIG. 3. The first gear unit 232 includes a rotor 234, an armature 236 and a shaft 240. The rotor 234 and the shaft 240 are one-piece formed with each other, making up a portion of the first gear unit 232. A clutch 238 is made up of the rotor 234 and the armature 236.

The disconnection and connection of the gear device 230 and the roller 220 are controlled depending on the rotation direction of the clutch 238. The control of the disconnection and connection of the gear device 230 and the roller 220 depending on the rotation direction of the clutch 238 will be described later in detail with reference to FIGS. 4 and 5.

The gear device 230 further includes an electromagnetic coil 250 which serves as a coupling force applying part. The electromagnetic coil 250 applies a coupling force so that the rotor 234 and the armature 236 can be coupled to each other. The electromagnetic coil 250 makes up a portion of an electromagnetic clutch. The rotor 234 and the armature 236 are brought into strong contact with each other by a magnetic force generated when an electric current is applied to the electromagnetic coil 250. The gear device 230 transmits the torque of the motor 210 to the roller 220.

Along with the movement of the gear device 230 away from the roller 220, the lock mechanism 260 applies a resistance force acting against the coupling force to the gear means 280, thereby generating a friction force in the gear means 280. The lock mechanism 260 will be described later in detail with reference to FIGS. 4 and 5.

The basic configuration of the drive device 200 according to the present embodiment has been described above with reference to FIGS. 2 and 3. According to the drive device 200, when the second gear unit 242 is disconnected from the roller 220, the lock mechanism 260 applies a resistance force acting against the coupling force for the coupling of the rotor 234 and the armature 236 to the gear means 280, whereby a friction force is generated in the gear means 280. This enables the rotor 234 and the armature 236 to slide upon each other in a state in which the coupling force is applied to the rotor 234 and the armature 236. As a result, it is possible to assure long-term stabilization of the clutch coupling force and to restrain the rotor 234 and the armature 236 from being coupled to each other in an unintentional state. For example, it is possible to remove rust generated on the coupling surfaces of the rotor 234 and the armature 236.

[Normal Mode and Cleaning Mode]

The drive device 200 according to the present embodiment operates in a normal mode or a cleaning mode. In the drive device 200 operating in the normal mode, the gear device 230 is driven so as to transmit the torque of the motor 210 to the roller 220. In the drive device 200 operating in the cleaning mode, the drive device 200 is driven so as to generate a friction force on the coupling surfaces of the rotor 234 and the armature 236. The drive device 200 controls the disconnection and connection of the gear device 230 and the roller 220 in a corresponding relationship with the rotation direction of the clutch 238, thereby switching the normal mode and the cleaning mode. The normal mode and the cleaning mode of the drive device 200 according to the present embodiment will now be described with reference to FIGS. 3 to 5.

Figure 4A:
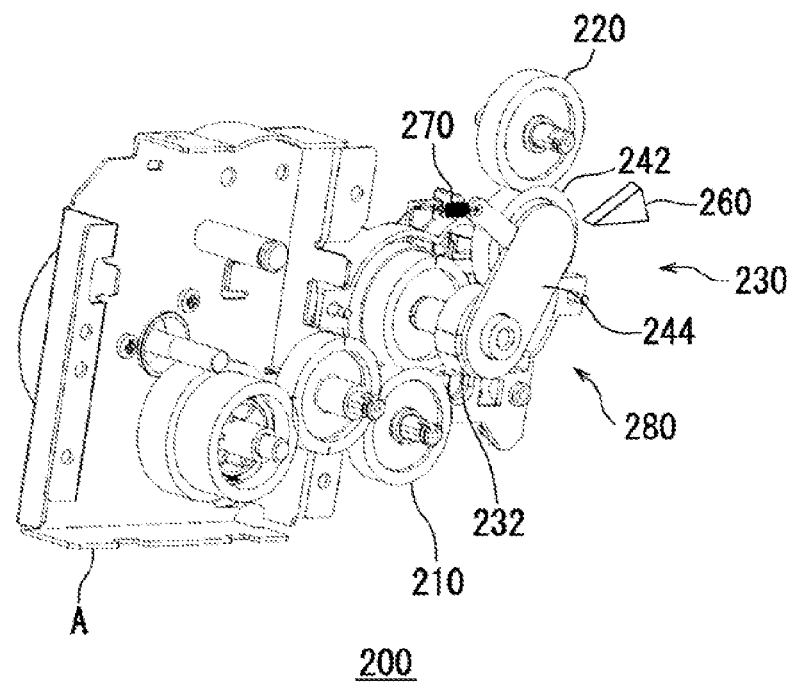
FIG. 4A is a perspective view showing the drive device according to the embodiment, which is operating in a normal mode.
Figure 4B:
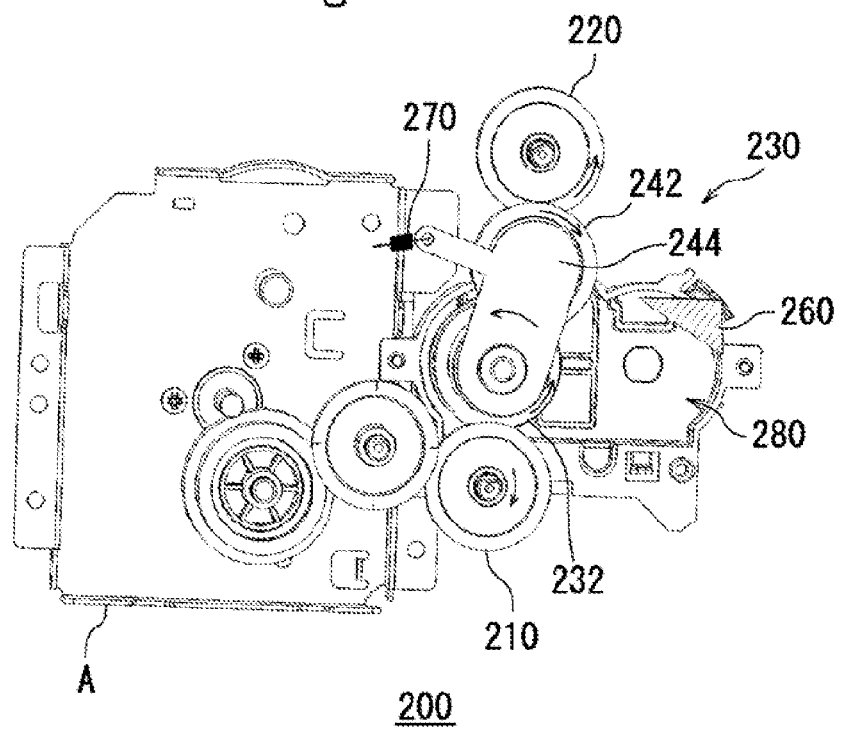
FIG. 4B is a front view showing the drive device according to the embodiment, which is operating in the normal mode.

FIGS. 4A and 4B show the drive device 200 operating in the normal mode. FIG. 4A is a perspective view showing the drive device 200 operating in the normal mode. FIG. 4B is a front view of the drive device 200 operating in the normal mode.

The disconnection and connection of the second gear unit 242 and the roller 220 is controlled in a corresponding relationship with the rotation direction of the clutch 238. In the normal mode, the rotor 234 and the armature 236 are brought into strong contact with each other by a magnetic force generated when an electric current is applied to the electromagnetic coil 250. Upon rotation of the motor 210 in the forward direction (clockwise direction), the clutch 238 rotates in the direction opposite to the forward direction (in the counterclockwise direction). In response, the gear of the first gear unit 232 also rotates in the direction opposite to the forward rotation direction of the motor 210 (in the counterclockwise direction). The second gear unit 242 connected to the gear of the first gear unit 232 rotates in the direction opposite to the rotation direction of the clutch 238 (in the clockwise direction).

The connecting unit 244 is fixed to the first gear unit 232 so as to rotate in the rotation direction of the first gear unit 232. If the first gear unit 232 rotates in the direction opposite to the forward rotation direction of the motor 210, the connecting unit 244 rotates about the first gear unit 232 in the direction opposite to the forward rotation direction of the motor 210. As a result, the second gear unit 242 and the roller 220 are connected to each other, whereby the torque of the motor 210 is transmitted to the roller 220. The drive device 200 continues to operate in the normal mode while the torque of the motor 210 is transmitted to the roller 220 by the connection of the second gear unit 242 and the roller 220.

Figure 5A:
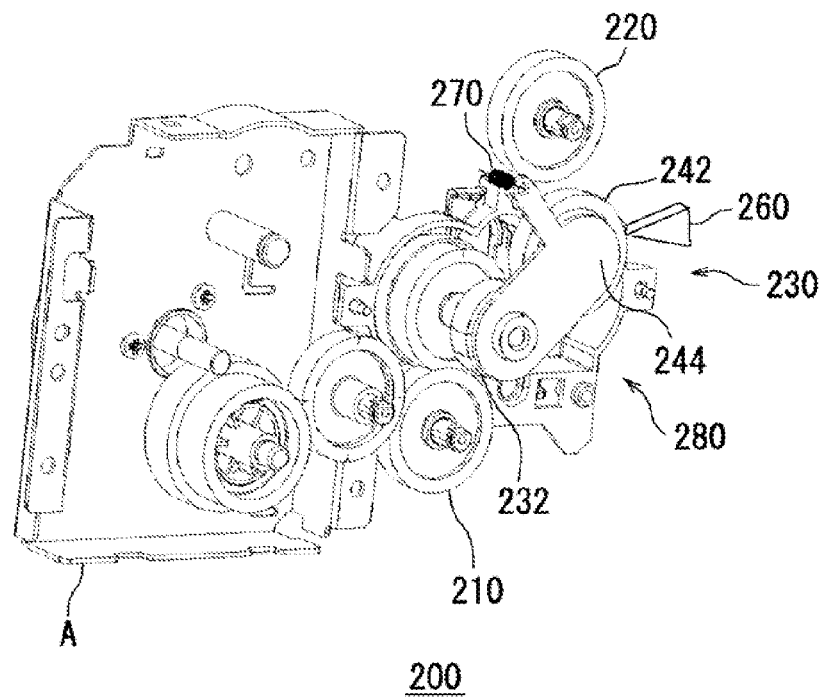
FIG. 5A is a perspective view showing the drive device according to the embodiment, which is operating in a cleaning mode.
Figure 5B:
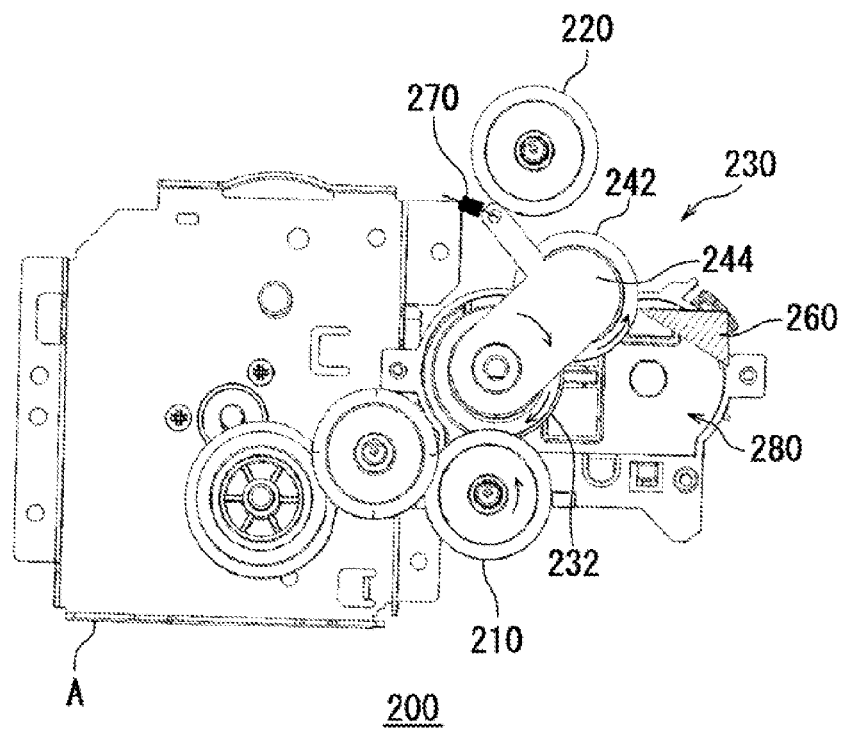
FIG. 5B is a front view showing the drive device according to the embodiment, which is operating in the cleaning mode.

FIGS. 5A and 5B show the drive device 200 operating in the cleaning mode. FIG. 5A is a perspective view showing the drive device 200 operating in the cleaning mode. FIG. 5B is a front view of the drive device 200 operating in the cleaning mode.

In the cleaning mode, the rotor 234 and the armature 236 are brought into contact with each other by a magnetic force generated when an electric current is applied to the electromagnetic coil 250. Upon rotation of the motor 210 in the direction opposite to the forward direction (in the counterclockwise direction), the clutch 238 rotates in the forward direction (clockwise direction). The gear of the first gear unit 232 also rotates in the direction opposite to the counterclockwise rotation direction of the motor 210 (in the clockwise direction). The second gear unit 242 connected to the gear of the first gear unit 232 rotates in the direction opposite to the rotation direction of the clutch 238 (in the counterclockwise direction). The connecting unit 244 is connected to the first gear unit 232 so as to rotate in the rotation direction of the first gear unit 232.

If the first gear unit 232 rotates in the direction opposite to the counterclockwise rotation direction of the motor 210, the connecting unit 244 rotates about the first gear unit 232 in the direction opposite to the rotation direction of the motor 210. As a result, the second gear unit 242 and the roller 220 are disconnected from each other, whereby the torque of the motor 210 is not transmitted to the roller 220.

In the present embodiment, the disconnection and connection of the gear device 230 and the roller 220 are controlled in a corresponding relationship with the rotation direction of the motor 210. More specifically, the second gear unit 242 connected to the first gear unit 232 through the connecting unit 244 is moved so as to describe a circular arc about the clutch 238. This makes it possible to control the transmission and interruption of the torque of the motor 210 with respect to the roller 220. In case where the second gear unit 242 is disconnected from the roller 220, the torque of the motor 210 is not transmitted to the roller 220.

After the gear device 230 and the roller 220 are disconnected from each other, the lock mechanism 260 generates a friction force on the coupling surfaces of the rotor 234 and the armature 236. Specifically, the second gear unit 242 connected to the first gear unit 232 through the connecting unit 244 is moved so as to describe a circular arc about the clutch 238. As a result, the second gear unit 242 comes into contact with the lock mechanism 260. The rotation of the second gear unit 242 is stopped if the second gear unit 242 comes into contact with the lock mechanism 260. Upon stoppage of the rotation of the second gear unit 242, the rotation of the rotor 234 is also stopped.

In the meantime, due to the rotation of the motor 210, the torque is continuously transmitted to the armature 236. As a result, a resistance force (circumferential shearing force) acting against the coupling force of the rotor 234 and the armature 236 is applied to the gear means 280. Thus, a friction force is generated on the coupling surfaces of the rotor 234 and the armature 236. This enables the rotor 234 and the armature 236 to slide upon each other in a state in which the coupling force is applied to the rotor 234 and the armature 236. Consequently, it is possible to remove rust generated on the coupling surfaces of the rotor 234 and the armature 236.

The cleaning mode realized by the drive device 200 goes on while the lock mechanism 260 generates a friction force on the coupling surfaces of the rotor 234 and the armature 236.

Regardless of the normal mode or the cleaning mode, the coil spring 270 continues to apply a biasing force to the gear device 230 in a direction in which the gear device 230 moves toward the roller 220 (specifically, in a direction in which the second gear unit 242 is connected to the roller 220). This makes it possible to stabilize and shorten the coupling time of the clutch 238. In particular, even when the drive device 200 is operating in the cleaning mode, it is possible to keep the gears moved toward the drive coupling side.

The drive device according to the present embodiment and the image forming device serving as an electronic device have been described above with reference to FIGS. 1 to 5. In case where the drive device according to the present embodiment is applied to the image forming device, the roller is not limited to the photosensitive drum. The roller may be a developing roller, a fixing roller, a sheet conveying roller, or the like. If the motor rotates, the torque thereof is transferred to the roller through the gear device. Thus, the roller is rotationally driven.

In the present embodiment, the color printer is employed as a specific example of the image forming device. However, it is possible in the present embodiment to employ other arbitrary image forming devices (such as a monochromatic printer and a composite machine). The drive device may be provided in an electronic device other than the image forming device. It goes without saying that the electronic device is applicable to, e.g., office automation equipment, such as a personal computer or the like, and a pinball machine.

According to the gear device of the present embodiment, a resistance force acting against the coupling force for the coupling of the rotor and the armature is applied to the gear means along with the movement of the gear means away from the roller, thereby generating a friction force. Therefore, if an electronic device is provided with the gear device according to the present embodiment, it is possible to cause the rotor and the armature to slide upon each other in a state in which a coupling force is applied to the rotor and the armature. As a result, it is possible to assure long-term stabilization of the clutch coupling force and to restrain the rotor and the armature from being coupled to each other in an unintentional state. For example, it is possible to remove rust generated on the coupling surfaces of the rotor and the armature.

What is claimed is:

1. A gear device, comprising:
   a gear means configured to transmit a torque of a motor to a rotating member,
   wherein the gear means includes a rotor, an armature, an electromagnetic coil configured to apply a coupling force so as to couple the rotor and the armature to each other and a locking mechanism configured to apply a resistance force acting against the coupling force to the gear means along with movement of the gear means away from the rotating member.

2. The gear device of claim 1, wherein the rotor and the armature make up a clutch and wherein disconnection and connection of the gear means and the rotating member are controlled in a corresponding relationship with a rotation direction of the clutch.

3. The gear device of claim 2, wherein gear means further includes a first gear unit connected to the motor, a second gear unit connected to the first gear unit and a connecting unit configured to interconnect the first gear unit and the second gear unit, the first gear unit including the rotor and the armature, disconnection and connection of the second gear unit and the rotating member being controlled depending on the rotation direction of the clutch.

4. The gear device of claim 1, wherein the locking mechanism is configured to generate the resistance force on a coupling surface of the rotor and the armature after the gear means is disconnected from the rotating member.

5. The gear device of claim 1, further comprising:
   a biasing force applying part configured to apply a biasing force to the gear means in a direction in which the gear means moves toward the rotating member.

6. A drive device, comprising:
   the gear device of claim 1;
   a motor configured to generate a torque; and
   a rotating member to which the torque of the motor is transmitted through the gear device.

7. An electronic device, comprising the drive device of claim 6.

* * * * *